US011340000B2

(12) United States Patent
Schmidt et al.

(10) Patent No.: US 11,340,000 B2
(45) Date of Patent: May 24, 2022

(54) METHOD FOR HANDLING FAULT MITIGATION IN A VAPOUR COMPRESSION SYSTEM

(71) Applicant: Danfoss A/S, Nordborg (DK)

(72) Inventors: Frede Schmidt, Sønderborg (DK); Jan Prins, Nordborg (DK); Kristian Fredslund, Haderslev (DK); Kenneth Bank Madsen, Nordborg (DK)

(73) Assignee: Danfoss A/S, Nordborg (DK)

( * ) Notice: Subject to any disclaimer, the term of this patent is extended or adjusted under 35 U.S.C. 154(b) by 280 days.

(21) Appl. No.: 16/461,937

(22) PCT Filed: Nov. 15, 2017

(86) PCT No.: PCT/EP2017/079358
§ 371 (c)(1),
(2) Date: May 17, 2019

(87) PCT Pub. No.: WO2018/095785
PCT Pub. Date: May 31, 2018

(65) Prior Publication Data
US 2019/0301780 A1    Oct. 3, 2019

(30) Foreign Application Priority Data

Nov. 22, 2016  (DK) .............................. PA201600721

(51) Int. Cl.
*F25B 41/00*    (2021.01)
*F25B 49/02*    (2006.01)
*F25B 41/34*    (2021.01)

(52) U.S. Cl.
CPC .............. *F25B 41/00* (2013.01); *F25B 41/34* (2021.01); *F25B 49/02* (2013.01);
(Continued)

(58) Field of Classification Search
CPC .............. F25B 2700/19; F25B 2700/21; F25B 2700/13; F25B 41/062; F25B 41/00
See application file for complete search history.

(56) References Cited

U.S. PATENT DOCUMENTS

| 4,209,996 A | 7/1980 | Shaw |
| 5,276,630 A | 1/1994 | Baldwin et al. |
| (Continued) | | |

FOREIGN PATENT DOCUMENTS

| CN | 1563825 A | 1/2005 |
| CN | 1788186 A | 6/2006 |
| (Continued) | | |

OTHER PUBLICATIONS

Indian First Examination Report for Application No. 201917014392 dated Jan. 18, 2021.
(Continued)

*Primary Examiner* — Jianying C Atkisson
*Assistant Examiner* — Meraj A Shaikh
(74) *Attorney, Agent, or Firm* — McCormick, Paulding & Huber PLLC

(57) ABSTRACT

A method for controlling a vapour compression system (1) is disclosed. A mass flow of refrigerant along a part of the refrigerant path is estimated, based on measurements performed by one or more pressure sensors (10, 12, 13) for measuring a refrigerant pressure at selected positions along the refrigerant path and one or more temperature sensors (11, 14) for measuring a refrigerant temperature at selected positions along the refrigerant path. A refrigerant pressure or a refrigerant temperature at a selected position a pressure sensor (10, 12, 13) or temperature sensor (11, 14) along the refrigerant path is derived, based on the estimated mass flow.

(Continued)

The vapour compression system (1) is allowed to continue operating, even if a sensor (10, 11, 12, 13, 14) is malfunctioning or unreliable.

20 Claims, 5 Drawing Sheets

(52) U.S. Cl.
CPC ............... *F25B 2341/0012* (2013.01); *F25B 2400/0407* (2013.01); *F25B 2400/0411* (2013.01); *F25B 2400/075* (2013.01); *F25B 2400/23* (2013.01); *F25B 2500/19* (2013.01); *F25B 2700/13* (2013.01); *F25B 2700/19* (2013.01); *F25B 2700/195* (2013.01); *F25B 2700/1933* (2013.01); *F25B 2700/21* (2013.01); *F25B 2700/21151* (2013.01); *F25B 2700/21163* (2013.01)

(56) References Cited

U.S. PATENT DOCUMENTS

| | | | |
|---|---|---|---|
| 5,440,895 A | 8/1995 | Bahel et al. | |
| 6,357,241 B1 | 3/2002 | Dudley | |
| 7,481,100 B2* | 1/2009 | Ponziani | G01M 15/14 73/112.01 |
| 10,486,499 B2 | 11/2019 | Stanke et al. | |
| 2003/0055603 A1 | 3/2003 | Rossi et al. | |
| 2003/0101739 A1 | 6/2003 | Moon et al. | |
| 2005/0126190 A1 | 6/2005 | Lifson et al. | |
| 2005/0251364 A1* | 11/2005 | Kang | G05B 9/02 702/183 |
| 2007/0095085 A1 | 5/2007 | Liu | |
| 2008/0022706 A1 | 1/2008 | Sakimichi et al. | |
| 2009/0260375 A1 | 10/2009 | Miyazaki et al. | |
| 2014/0150489 A1 | 6/2014 | Gan et al. | |
| 2014/0208785 A1 | 7/2014 | Wallace et al. | |
| 2015/0096321 A1 | 4/2015 | Kawano et al. | |
| 2015/0143841 A1 | 5/2015 | Kawano et al. | |
| 2016/0102901 A1* | 4/2016 | Christensen | F25B 49/022 62/117 |
| 2016/0200176 A1* | 7/2016 | Stanke | B60H 1/00978 62/115 |
| 2019/0299132 A1 | 10/2019 | Prins et al. | |

FOREIGN PATENT DOCUMENTS

| | | |
|---|---|---|
| CN | 101504178 A | 8/2009 |
| CN | 102519119 A | 6/2012 |
| EP | 3023712 A1 | 5/2016 |
| KR | 20160032197 A | 3/2016 |

OTHER PUBLICATIONS

Xin-Hua Xu et al., "Experimental Study on Sensor Fault Detection and Diagnosis and Estimation of Centrifugal Chiller System," Building Science, vol. 23, No. 6, dated Jun. 2007, and its English abstract.

International Search Report For Serial No. PCT/EP2017/079358 dated Sep. 2, 2018.

International Search Report for Serial No. PCT/EP2017/079360 dated Mar. 20, 2018.

International Search Report for Serial No. PCT/EP2017/079359 dated Jan. 25, 2018.

\* cited by examiner

METHOD FOR HANDLING FAULT MITIGATION IN A VAPOUR COMPRESSION SYSTEM

CROSS-REFERENCE TO RELATED APPLICATIONS

This application is a National Stage application of International Patent Application No. PCT/EP2017/079358, filed on Nov. 15, 2017, which claims priority to Danish Patent Application No. PA201600721, filed on Nov. 22, 2016, each of which is hereby incorporated by reference in its entirety.

TECHNICAL FIELD

The present invention relates to a method for controlling a vapour compression system, such as a refrigeration system, a heat pump or an air condition system, in which the vapour compression system is allowed to keep operating if a sensor measuring a control parameter is malfunctioning.

BACKGROUND

Vapour compression systems, such as refrigeration systems, heat pumps or air condition systems, are normally controlled in order to provide a required cooling or heating capacity in an as energy efficient manner as possible. To this end, a number of sensors, such as pressure sensors and temperature sensors, are arranged along the refrigerant path of the vapour compression system, and various components of the vapour compression system, such as valves, compressors, etc. are controlled on the basis of the measurements performed by the sensors.

If one of the sensors is malfunctioning or unreliable, the operation of the vapour compression system may become energy inefficient, and the system may even become unstable or the system may become unable to provide the required cooling or heating capacity, if it continues operating without the input from the malfunctioning or unreliable sensor. It may therefore be necessary to shut down the vapour compression system and to request immediate service on the system. This is very undesirable and may be very costly.

In order to avoid shutting down of a vapour compression system with a malfunctioning or unreliable sensor, various solutions have been suggested for allowing continued operation of the vapour compression system without the input from the malfunctioning or unreliable sensor, and without risking that the vapour compression system becomes unstable, while ensuring that a required cooling or heating capacity can be provided.

U.S. Pat. No. 5,276,630 discloses a method of operating a controller of an HVAC system which can be operated according to various operating modes. The validity of each of a plurality of input devices is constantly established, and the mode of operation of the HVAC system is reconfigured each time the validity of any of the plurality of input devices changes to ensure that the HVAC system operates in the best available mode of operation. For instance, if an input device is malfunctioning, the best available operation mode, which does not require input from the malfunctioning input device, is selected.

U.S. Pat. No. 5,440,895 discloses a microprocessor-based HVAC control system which detects sensor faults by comparing thermistor readings with predetermined extreme values, indicative of sensor fault. The system automatically selects an appropriate combination of automatic/preset modes of operating key system components, such as the expansion valve, the demand defrost system and the indoor fan speed control system, based on which sensor or sensors have been found to be malfunctioning.

U.S. Pat. No. 6,357,241 B1 discloses a method of controlling a refrigerant cycle. A controller monitors a suction pressure sensor signal to ensure the suction pressure sensor is operating properly. If the suction pressure sensor fails, then a control algorithm is utilized wherein a minimum open percentage is set for a suction modulation valve, and the suction modulation valve is not allowed to close beyond the minimum suction modulation valve percentage opening.

Common to the prior art methods described above is that they all ensure safe operation of the system in case of sensor malfunction, but the operation of the system is not optimal, e.g. from an energy consumption perspective.

SUMMARY

It is an object of embodiments of the invention to provide a method for controlling a vapour compression system in which energy efficient operation of the vapour compression system is provided in case of sensor malfunction.

It is a further object of embodiments of the invention to provide a method for controlling a vapour compression system in which absence of a sensor input can be compensated.

The invention provides a method for controlling a vapour compression system, the vapour compression system comprising at least one compressor, a heat rejecting heat exchanger, a high pressure expansion device, a receiver, an evaporator expansion device, an evaporator and a gas bypass valve, arranged in a refrigerant path, the vapour compression system further comprising one or more pressure sensors for measuring a refrigerant pressure at selected positions along the refrigerant path and one or more temperature sensors for measuring a refrigerant temperature at selected positions along the refrigerant path, the method comprising the steps of:

estimating a mass flow of gaseous refrigerant along a part of the refrigerant path, based on measurements performed by some of the pressure sensors and temperature sensors, and deriving a refrigerant pressure or a refrigerant temperature at a selected position of a pressure sensor or temperature sensor along the refrigerant path, based on the estimated mass flow.

The method according to the invention is a method for controlling a vapour compression system. In the present context the term 'vapour compression system' should be interpreted to mean any system in which a flow of fluid medium, such as refrigerant, circulates and is alternatingly compressed and expanded, thereby providing either refrigeration or heating of a volume. Thus, the vapour compression system could, e.g., be a refrigeration system, an air condition system or a heat pump.

The vapour compression system comprises at least one compressor, a heat rejecting heat exchanger, a high pressure expansion device, a receiver, an evaporator expansion device, an evaporator and a gas bypass valve, arranged in a refrigerant path. Refrigerant flowing in the refrigerant path is compressed by the compressor(s) before being supplied to the heat rejecting heat exchanger. In the heat rejecting heat exchanger, heat exchange takes place between the refrigerant and the ambient or a secondary fluid flow across the heat rejecting heat exchanger, in such a manner that heat is rejected from the refrigerant flowing through the heat rejecting heat exchanger. The heat rejecting heat exchanger may be in the form of a condenser, in which case at least part of the refrigerant passing through the heat rejecting heat exchanger is condensed, and the refrigerant leaving the heat rejecting heat exchanger is, in this case, at least partly in a liquid state. As an alternative, the heat rejecting heat exchanger may be in the form of a gas cooler, in which case the refrigerant passing through the heat rejecting heat exchanger is cooled, but remains in a gaseous state.

The refrigerant leaving the heat rejecting heat exchanger passes through the high pressure expansion device before being supplied to the receiver. In the high pressure expansion device, the refrigerant undergoes expansion, and the refrigerant received in the receiver is therefore a mixture of liquid and gaseous refrigerant. The high pressure expansion device may, e.g., be in the form of a high pressure valve. As an alternative, the high pressure expansion device may be in the form of an ejector. As another alternative, the high pressure expansion device may include at least one high pressure valve and at least one ejector arranged in parallel.

In the receiver the refrigerant is separated into a liquid part and a gaseous part. The liquid part of the refrigerant is supplied to the evaporator expansion device, via a liquid outlet of the receiver. The evaporator expansion device controls a supply of refrigerant to the evaporator, and the refrigerant undergoes expansion when passing through the evaporator expansion device. Accordingly, the refrigerant being supplied to the evaporator is a mixture of liquid and gaseous refrigerant. The evaporator expansion device may, e.g., be in the form of an expansion valve.

In the evaporator the liquid part of the refrigerant is evaporated, while heat exchange takes place between the refrigerant and the ambient or a secondary fluid flow across the evaporator, in such a manner that heat is absorbed by the refrigerant passing through the evaporator. Finally, the refrigerant is supplied to an inlet of the compressor(s).

At least part of the gaseous part of the refrigerant in the receiver may be supplied directly to the inlet of the compressor(s), via a gaseous outlet of the receiver and the gas bypass valve. Accordingly, the gas bypass valve controls the supply of gaseous refrigerant from the receiver to the compressor(s).

The vapour compression system further comprises one or more pressure sensors for measuring a refrigerant pressure at selected positions along the refrigerant path and one or more temperature sensors for measuring a refrigerant temperature at selected position along the refrigerant path. The pressure sensor(s) and the temperature sensor(s) may be arranged in the refrigerant path, and thereby in direct contact with the refrigerant. As an alternative, at least the temperature sensor (s) may be mounted in thermal contact with piping of the vapour compression system, and thereby in thermal contact, but not direct contact, with refrigerant flowing in the refrigerant path.

The pressure sensor(s) and the temperature sensor(s) provide measurements which can be used as control input for controlling the vapour compression system. For instance, the pressure sensor(s) may be arranged for measuring the pressure of refrigerant leaving the heat rejecting heat exchanger, the pressure prevailing inside the receiver, the pressure prevailing in the suction line, and/or a refrigerant pressure at any other suitable position along the refrigerant path. Similarly, the temperature sensor(s) may be arranged for measuring the temperature of refrigerant leaving the heat rejecting heat exchanger, the temperature prevailing inside the receiver, the temperature prevailing in the suction line, the evaporating temperature, and/or a refrigerant temperature at any other suitable position along the refrigerant path.

For instance, the opening degree of the evaporator expansion device may be controlled on the basis of a superheat value of refrigerant leaving the evaporator. The superheat value can, e.g., be derived from measurements of the evaporating temperature and the temperature of refrigerant leaving the evaporator, i.e. the temperature prevailing in the suction line. As an alternative, the superheat can be derived from measurements of the pressure of refrigerant leaving the evaporator, i.e. the pressure prevailing in the suction line, and the temperature of refrigerant leaving the evaporator.

Furthermore, the opening degree of the high pressure expansion device may be controlled on the basis of measurements of temperature and/or pressure of refrigerant leaving the heat rejecting heat exchanger and temperature and/or pressure prevailing inside the receiver.

Finally, the opening degree of the gas bypass valve may be controlled on the basis of the pressure prevailing inside the receiver.

Thus, in the case that one of the sensors is malfunctioning or unreliable, the control of such components, which are vital to the operation of the vapour compression system, becomes unreliable or even impossible.

According to the method of the invention, a mass flow of gaseous refrigerant along a part of the refrigerant path is initially estimated, based on measurements performed by some of the pressure sensors and temperature sensors. For instance, a pressure difference between a pressure prevailing at a first position of the refrigerant path and a pressure prevailing at a second position of the refrigerant path may be used for estimating the mass flow of refrigerant from the first position to the second position. Similarly, other suitable measurements of refrigerant temperature and refrigerant pressure may be used for estimating a mass flow along a given part of the refrigerant path, since such measurements provide suitable information regarding the dynamics of the vapour compression system under the given operating conditions. The estimated mass flow could, e.g., be the mass flow through a component of the vapour compression system, such as trough a valve or a heat exchanger.

In any event, only measurements performed by some of the sensors are used for estimating the mass flow of gaseous refrigerant, i.e. measurements performed by at least one of the sensors are not used.

Next, a refrigerant pressure or a refrigerant temperature at a selected position of a pressure sensor or a temperature sensor along the refrigerant path is derived, based on the estimated mass flow. The refrigerant pressure or refrigerant temperature may, e.g., be derived using calculations, look-up tables, models and/or it may be derived in any other suitable manner. Thus, the derived refrigerant pressure or refrigerant temperature corresponds to measurements being performed by a sensor arranged at the selected position. Accordingly, the method of the invention can be used for providing pressure values or temperature values corresponding to measurements performed by one of the sensors, without requiring direct measurements from that sensor.

Thus, reliable values can be obtained, even if the sensor is malfunctioning or unreliable. This allows the vapour compression system to continue operating, even if a sensor providing a vital control parameter is malfunctioning or unreliable. Furthermore, this can be done without having to take special precaution measures which might reduce the energy efficiency of the vapour compression system.

Furthermore, the derived refrigerant pressure or refrigerant temperature may be compared to actual measurements performed by the sensor arranged at the selected position along the refrigerant path, in order to evaluate the reliability of the sensor. This will be described in further detail below.

The step of deriving a refrigerant pressure or a refrigerant temperature may further be performed on the basis of one or more measurements performed by the pressure sensors and/or the temperature sensors. According to this embodiment, the derived refrigerant pressure or refrigerant temperature is derived using the estimated mass flow of gaseous refrigerant as well as one or more measurements performed by the pressure sensors and/or temperature sensors. The measurements may advantageously originate from one or more sensors being arranged in other positions than the selected position.

For instance, the derived refrigerant pressure or refrigerant temperature may be derived using model based calculations, where the model provides correlation between the various values measured by the sensors and the mass flow of gaseous refrigerant along selected part of the refrigerant path.

The method may further comprise the step of controlling the vapour compression system using the derived refrigerant pressure or refrigerant temperature as a control parameter. According to this embodiment, the vapour compression system can continue operating in a normal manner, even though a sensor is malfunctioning or unreliable. The required measurements from the malfunctioning or unreliable sensor are simply replaced by the derived values. Accordingly, there is no need for an emergency shut down of the vapour compression system, and a maintenance visit can be scheduled at a convenient time.

The method may further comprise the step of comparing the derived refrigerant pressure or refrigerant temperature to a measured refrigerant pressure or refrigerant temperature obtained by means of a pressure sensor or temperature sensor arranged at the selected position along the refrigerant path.

According to this embodiment, the derived refrigerant pressure or refrigerant temperature may be used for evaluating the reliability of the sensor measurements received from the sensor being arranged at the selected position along the refrigerant path. If there is a discrepancy between the measured values received from the sensor and the derived values, this is an indication that something may be wrong with the sensor. For instance, the sensor may be malfunctioning. Alternatively, the sensor may be drifting, and may now have reached a situation where the measurements performed by the sensor are no longer reliable. As another alternative, the sensor may have been moved away from the position where it was originally arranged. For instance, in the case that the sensor is a temperature sensor arranged on an outer surface of a pipe of the vapour compression system, the sensor may become detached from the pipe. In this case the sensor as such may still operate reliably, but since it is no longer in thermal contact with the refrigerant at the expected position of the refrigerant path, the sensor no longer provides measurements of the refrigerant temperature at this position. A comparison between the measured values provided by the sensor and the derived values will, in this case, reveal that the sensor measurements are incorrect, and maintenance can be ordered, while the vapour compression system continues operating, based on the derived values.

The method may further comprise the step of registering that one of the pressure sensor(s) or one of the temperature sensor(s) is malfunctioning, and the derived refrigerant pressure or refrigerant temperature may correspond to pressure measurements or temperature measurements performed by the malfunctioning sensor. The step of registering that one of the sensors is malfunctioning could, e.g., be performed by comparing measured values and derived values, as described above. As an alternative, the step of registering that one of the sensor is malfunctioning could include receiving an alarm or a notification from the sensor in question.

The step of estimating a mass flow of refrigerant may further be based on a current compressor capacity and/or on an opening degree of one or more valves of the vapour compression system. The current compressor capacity and the opening degrees of the valves of the vapour compression system provide valuable information regarding the expected mass flow of refrigerant along the refrigerant path of the vapour compression system. Accordingly, including such information when estimating the mass flow of refrigerant along a part of the refrigerant path, may result in a more accurate estimate.

The estimated mass flow of refrigerant may be a mass flow of refrigerant through the gas bypass valve. According to this embodiment the estimated mass flow of refrigerant is the mass flow of refrigerant from the receiver towards the compressor(s), via the gas bypass valve. This mass flow of refrigerant depends on the pressure prevailing inside the receiver, and it may therefore advantageously be used for deriving the pressure prevailing inside the receiver.

The derived refrigerant pressure or refrigerant temperature may be a pressure of refrigerant leaving the heat rejecting heat exchanger. According to this embodiment, it is possible to continue operating the vapour compression system, even though the pressure sensor arranged for measuring the pressure of refrigerant leaving the heat rejecting heat exchanger is malfunctioning or unreliable. The pressure of refrigerant leaving the heat rejecting heat exchanger may, e.g., be used as a control parameter for controlling the high pressure expansion device.

As an alternative, the derived refrigerant pressure or refrigerant temperature may be a temperature of refrigerant leaving the heat rejecting heat exchanger. According to this embodiment, it is possible to continue operating the vapour compression system, even though the temperature sensor arranged for measuring the temperature of refrigerant leaving the heat rejecting heat exchanger is malfunctioning or unreliable. The temperature of refrigerant leaving the heat rejecting heat exchanger may, e.g., also be used as a control parameter for controlling the high pressure expansion device.

As another alternative, the derived refrigerant pressure or refrigerant temperature may be representative for a pressure prevailing inside the receiver. According to this embodiment, it is possible to continue operating the vapour compression system, even though the pressure sensor arranged for measuring the pressure prevailing inside the receiver is malfunctioning or unreliable. The pressure prevailing inside the receiver may, e.g., be used as a control parameter for controlling the gas bypass valve and/or the evaporator expansion device.

BRIEF DESCRIPTION OF THE DRAWINGS

The invention will now be described in further detailed with reference to the accompanying drawings in which.

DETAILED DESCRIPTION

Figure 1:
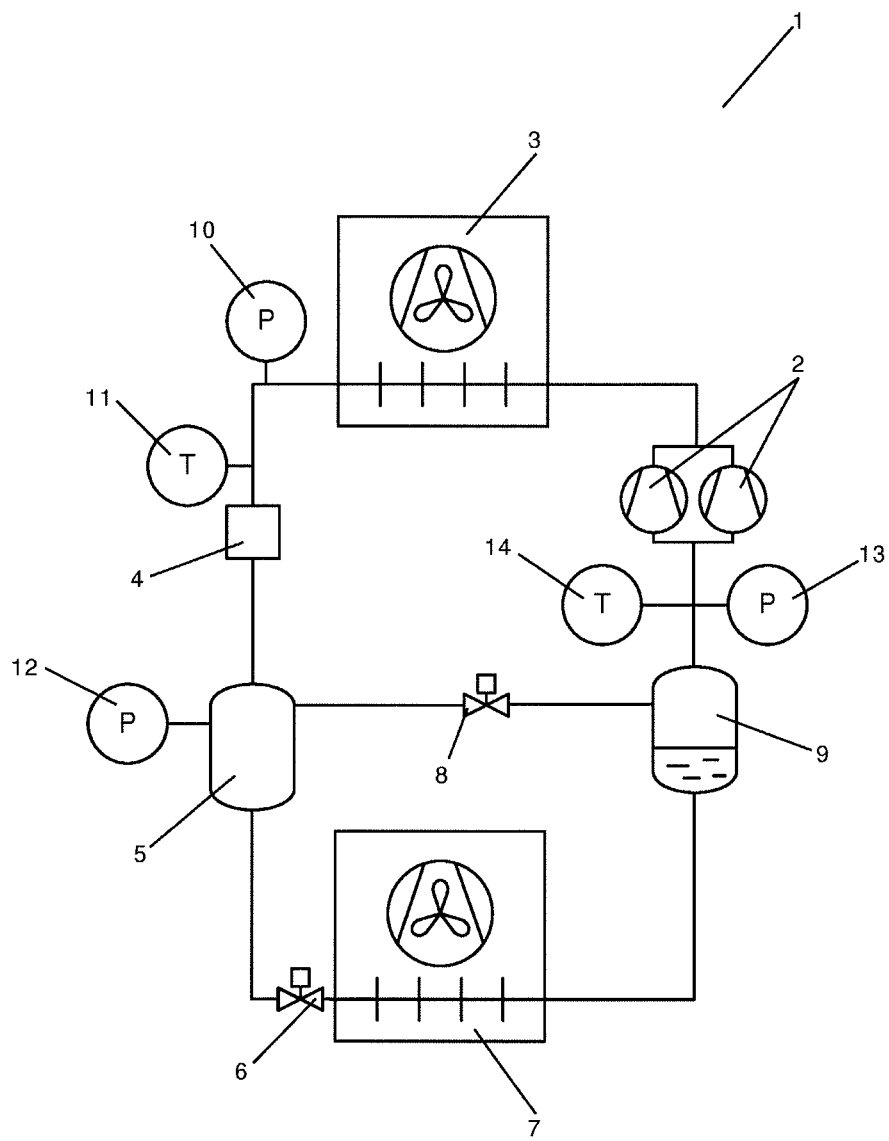
FIG. 1 is a diagrammatic view of a vapour compression system being controlled using a method according to a first embodiment of the invention.

FIG. 1 is a diagrammatic view of a vapour compression system 1 being controlled using a method according to a first embodiment of the invention. The vapour compression system 1 comprises a compressor unit comprising a number of compressors 2, two of which are shown, a heat rejecting heat exchanger 3, a high pressure expansion device 4, a receiver 5, an evaporator expansion device 6, in the form of an expansion valve, an evaporator 7, a gas bypass valve 8 and a suction line receiver 9 arranged in a refrigerant path.

Refrigerant flowing in the refrigerant path is compressed by the compressors 2 before being supplied to the heat rejecting heat exchanger 3. In the heat rejecting heat exchanger 3, heat exchange takes place with a secondary fluid flow across the heat rejecting heat exchanger 3 in such a manner that heat is rejected from the refrigerant. In the case that the heat rejecting heat exchanger 3 is in the form of a condenser, the refrigerant passing through the heat rejecting heat exchanger 3 is at least partly condensed. In the case that the heat rejecting heat exchanger 3 is in the form of a gas cooler, the refrigerant passing through the heat rejecting heat exchanger 3 is cooled, but it remains in a gaseous state.

The refrigerant leaving the heat rejecting heat exchanger 3 is passed through the high pressure expansion device 4 before being supplied to the receiver 5. The high pressure expansion device 4 may, e.g., be in the form of a high pressure valve, in the form of an ejector, or in the form of a high pressure valve and an ejector arranged in parallel. In any event, refrigerant passing through the high pressure expansion device 4 undergoes expansion.

In the receiver 5, the refrigerant is separated into a liquid part and a gaseous part. The liquid part of the refrigerant is supplied to the evaporator expansion device 6, where it undergoes expansion before being supplied to the evaporator 7. In the evaporator 7, heat exchange takes place with a secondary fluid flow across the evaporator 7 in such a manner that heat is absorbed by the refrigerant, while the refrigerant is at least partly evaporated. The refrigerant leaving the evaporator 7 is supplied to the suction line receiver 9, where it is separated into a liquid part and a gaseous part. The gaseous part of the refrigerant is supplied to the compressors 2. The liquid part of the refrigerant slowly evaporates, and is then supplied to the compressors 2.

At least part of the gaseous part of the refrigerant in the receiver 5 is supplied to the suction line receiver 9, via the gas bypass valve 8. Thus, the refrigerant leaving the evaporator 7 is mixed with gaseous refrigerant supplied from the receiver 5 in the suction line receiver 9. The mass flow of gaseous refrigerant from the receiver 5 towards the suction line receiver 9, and thereby towards the compressors 2, is controlled by controlling an opening degree of the gas bypass valve 8.

The vapour compression system 1 is further provided with a number of sensors arranged at selected positions along the refrigerant path. A pressure sensor 10 is arranged near the outlet of the heat rejecting heat exchanger 3 for measuring the pressure of refrigerant leaving the heat rejecting heat exchanger 3. A temperature sensor 11 is arranged near the outlet of the heat rejecting heat exchanger 3 for measuring the temperature of refrigerant leaving the heat rejecting heat exchanger 3. A pressure sensor 12 is arranged in the receiver 5 for measuring the pressure prevailing inside the receiver 5. A pressure sensor 13 is arranged near the inlet of the compressors 2 for measuring the refrigerant pressure in the suction line. A temperature sensor 14 is arranged near the inlet of the compressors 2 for measuring the refrigerant temperature in the suction line.

The vapour compression system 1 is controlled on the basis of measurements performed by at least some of the sensors 10, 11, 12, 13, 14. For instance, the high pressure expansion device 4 may be controlled on the basis of measurements performed by pressure sensor 10 and/or measurements performed by pressure sensor 12. The evaporator expansion device 6 may be controlled on the basis of measurements performed by pressure sensor 13 and measurements performed by temperature sensor 14. The gas bypass valve 8 may be controlled on the basis of measurements performed by pressure sensor 12 and/or measurements performed by pressure sensor 13.

In the case that one of the sensors 10, 11, 12, 13, 14 is malfunctioning or unreliable, it is no longer possible to control the vapour compression system 1 on the basis of measurements performed by this sensor 10, 11, 12, 13, 14. According to the method of the invention, continued operation of the vapour compression system 1 is allowed in the following manner.

A mass flow of gaseous refrigerant along a part of the refrigerant path is estimated, based on measurements performed by at least some of the sensors 10, 11, 12, 13, 14 which are not malfunctioning or unreliable. For instance, the mass flow of gaseous refrigerant through the gas bypass valve 8 may be estimated in this manner. The estimation may be performed using a model reflecting the mass flow of refrigerant in the refrigerant path under various operating conditions and under various pressure levels and temperature levels of the refrigerant at selected positions along the refrigerant path.

Based on the estimated mass flow, a refrigerant pressure or refrigerant temperature is derived, which corresponds to the pressure measurements or temperature measurements which the malfunctioning or unreliable sensor 10, 11, 12, 13, 14 would normally perform. Thus, the measurements of the malfunctioning or unreliable sensor 10, 11, 12, 13, 14 can be replaced by the derived values, and the vapour compression system 1 can continue operating until a maintenance visit can be scheduled.

The method may further be used for evaluating the sensors 10, 11, 12, 13, 14 by comparing a derived refrigerant pressure or refrigerant temperature to measurements performed by the corresponding sensor 10. In the case that there is a discrepancy between the measured values and the derived values, this is an indication that the sensor 10, 11, 12, 13, 14 may be malfunctioning or unreliable.

Figure 2:
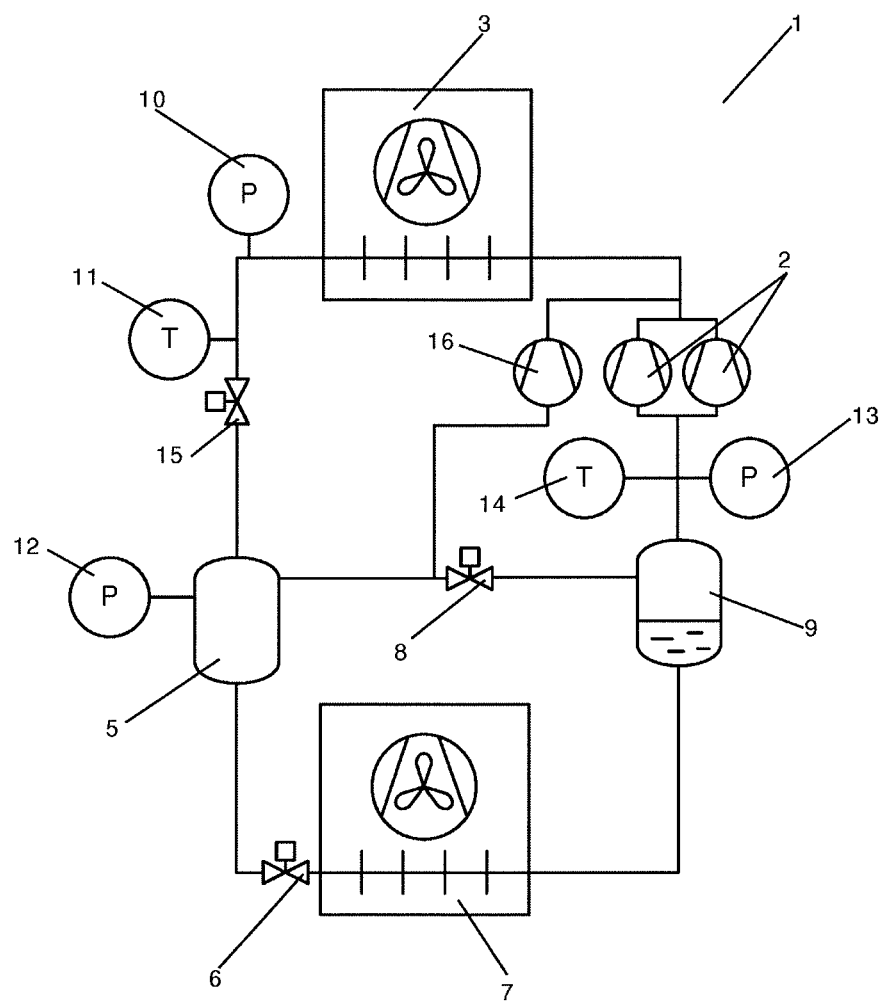
FIG. 2 is a diagrammatic view of a vapour compression system being controlled using a method according to a second embodiment of the invention.

FIG. 2 is a diagrammatic view of a vapour compression system 1 being controlled using a method according to a second embodiment of the invention. The vapour compression system 1 is very similar to the vapour compression system 1 of FIG. 1, and it will therefore not be described in detail here.

In the vapour compression system 1 of FIG. 2, the high pressure expansion device is in the form of a high pressure valve 15. Furthermore, the vapour compression system 1 comprises a receiver compressor 16. Gaseous refrigerant is supplied directly from the receiver 5 to the receiver compressor 16. Accordingly, this gaseous refrigerant is not subjected to the pressure drop which is introduced when the refrigerant passes through the gas bypass valve 8 and is mixed with the refrigerant leaving the evaporator 9. This reduces the energy required in order to compress the refrigerant.

In the case that one of the sensors 10, 11, 12, 13, 14 is malfunctioning or unreliable, continued operation of the vapour compression system 1 can be ensured essentially in the manner described above with reference to FIG. 1.

Figure 3:
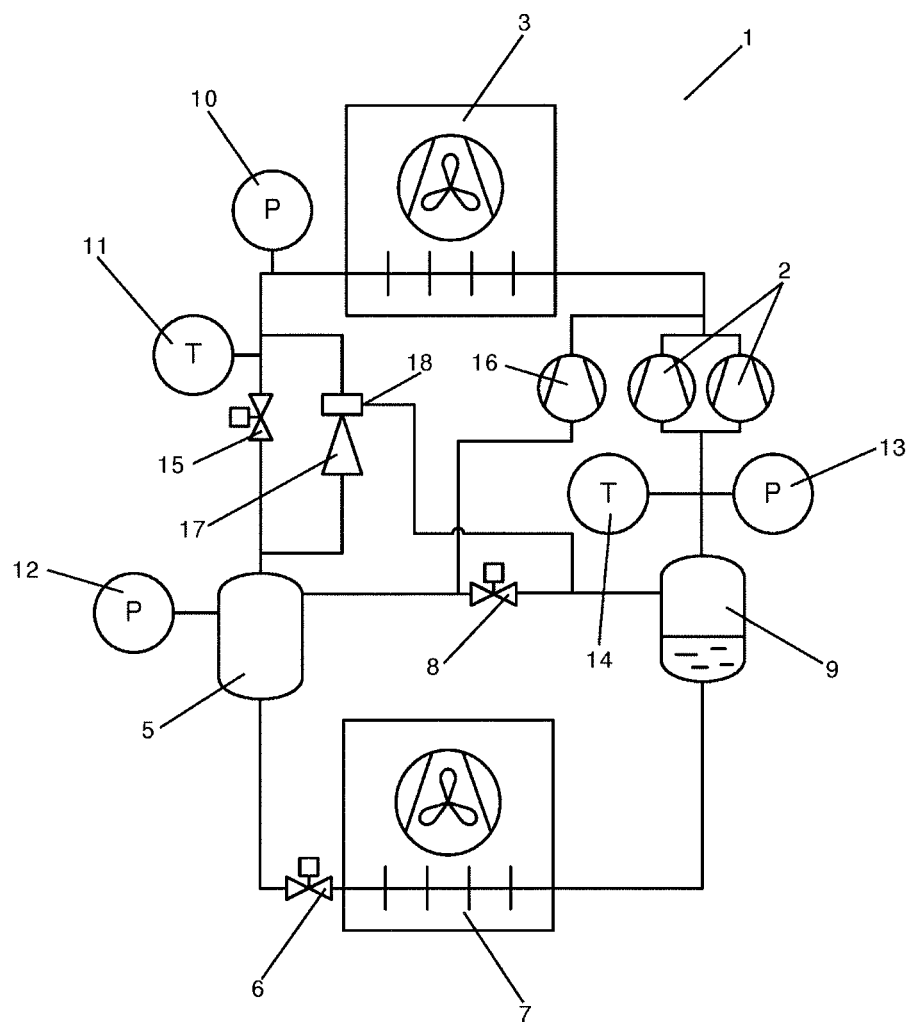
FIG. 3 is a diagrammatic view of a vapour compression system being controlled using a method according to a third embodiment of the invention.

FIG. 3 is a diagrammatic view of a vapour compression system 1 being controlled using a method according to a third embodiment of the invention. The vapour compression system 1 of FIG. 3 is very similar to the vapour compression system 1 of FIG. 2, and it will therefore not be described in detail here.

In the vapour compression system 1 of FIG. 3, the high pressure expansion device is in the form of a high pressure valve 15 and an ejector 17 arranged in parallel. Accordingly, some of the refrigerant leaving the heat rejecting heat exchanger 3 passes through the high pressure valve 15, and some of the refrigerant passes through the ejector 17 before being supplied to the receiver 5. A secondary inlet 18 of the ejector 17 is connected to the suction line. Thereby refrigerant is sucked from the suction line into the ejector 17, reducing the load on the compressors 2. This even further reduces the energy consumption of the vapour compression system 1.

In the case that one of the sensors 10, 11, 12, 13, 14 is malfunctioning or unreliable, continued operation of the vapour compression system 1 can be ensured essentially in the manner described above with reference to FIG. 1.

Figure 4:
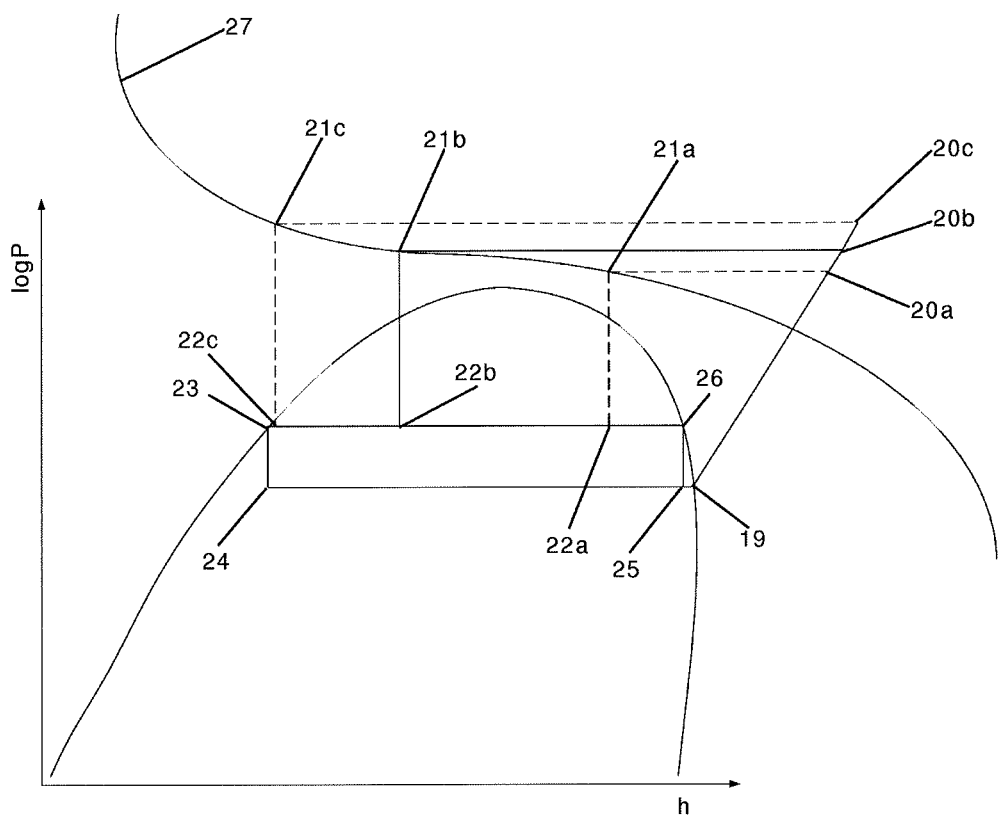
FIG. 4 is a log P-h diagram illustrating a method according to an embodiment of the invention.

FIG. 4 is a log P-h diagram illustrating a method according to an embodiment of the invention. The vapour compression system being controlled could, e.g., be one of the vapour compression systems illustrated in FIGS. 1-3.

From point 19 to point 20 refrigerant is compressed by the compressors, resulting in an increase in enthalpy and pressure. From point 20 to point 21 refrigerant passes through the heat rejecting heat exchanger, resulting in a decrease in the temperature of the refrigerant, and thereby a decrease in enthalpy, while the pressure remains substantially constant. From point 21 to point 22 the refrigerant passes through the high pressure expansion device, resulting in a decrease in pressure, while the enthalpy remains substantially constant. From point 23 to point 24 the liquid part of the refrigerant passes through the evaporator expansion device, also resulting in a decrease in pressure, while the enthalpy remains substantially constant. From point 24 to point 25 the refrigerant passes through the evaporator, resulting in an increase in the temperature of the refrigerant, and thereby an increase in enthalpy, while the pressure remains substantially constant. From point 26 to point 25 the gaseous part of the refrigerant in the receiver passes through the gas bypass valve, resulting in a decrease in pressure, while the enthalpy remains substantially constant.

In the case that the pressure sensor arranged for measuring the pressure of refrigerant leaving the heat rejecting heat exchanger is malfunctioning or unreliable, the pressure level of the refrigerant passing through the heat rejecting heat exchanger is not known. However, as long as the temperature sensor arranged for measuring the temperature of refrigerant leaving the heat rejecting heat exchanger is operating reliably, it is known that the point 21 must be on a given isotherm 27.

In FIG. 4, three different paths, corresponding to three different pressure values of the refrigerant leaving the heat rejecting heat exchanger are illustrated. A first path, point 19-point 20a-point 21a-point 22a, corresponds to a low pressure value. A second path, point 19-point 20b-point 21b-point 22b, corresponds to a medium pressure value. A third path, point 19-point 20c-point 21c-point 22c, corresponds to a high pressure level. The position of point 22 along the enthalpy axis reflects the gas to liquid ratio in the receiver. The position of point 22a illustrates a situation in which the gas to liquid ratio is high, the position of point 22b illustrates a situation in which the gas to liquid ratio is medium, and the position of point 22c illustrates a situation in which the gas to liquid ratio is low. The gas to liquid ratio in the receiver affects the mass flow of gaseous refrigerant through the gas bypass valve. Accordingly, if this mass flow is estimated, the position of point 22 can also be estimated, and thereby a value of the pressure of refrigerant leaving the heat rejecting heat exchanger can be derived.

Figure 5:
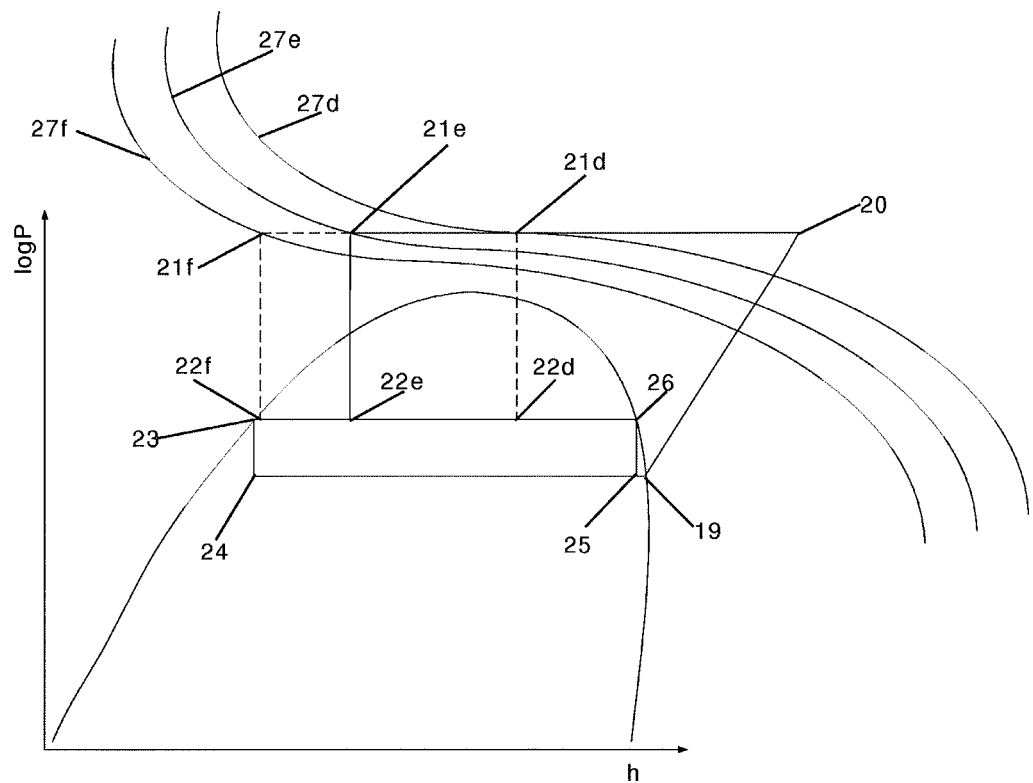
FIG. 5 is a log P-h diagram illustrating a method according to an alternative embodiment of the invention.

FIG. 5 is a log P-h diagram illustrating a method according to an alternative embodiment of the invention. The log P-h diagram of FIG. 5 is similar to the log P-h diagram of FIG. 4, and it will therefore not be described in detail here.

In the case that the temperature sensor arranged for measuring the temperature of refrigerant leaving the heat rejecting heat exchanger is malfunctioning or unreliable, the temperature of the refrigerant passing through the heat rejecting heat exchanger is not known. However, as long as the pressure sensor arranged for measuring the pressure of refrigerant leaving the heat rejecting heat exchanger is operating reliably, it is known that the point 21 must be at a given pressure level.

In FIG. 5, three different paths, corresponding to three different temperature values of the refrigerant leaving the heat rejecting heat exchanger, illustrated by three isotherms 27d, 27e, 27f, are illustrated. A first path, point 19-point 20-point 21d-point 22d, corresponds to a high temperature value. A second path, point 19-point 20-point 21e-point 22e, corresponds to a medium temperature value. A third path, point 19-point 20-point 21f-point 22f, corresponds to a low temperature value. As described above, the position of point 22 along the enthalpy axis reflects the gas to liquid ratio in the receiver, which affects the mass flow of gaseous refrigerant through the gas bypass valve. Accordingly, if this mass flow is estimated, the position of point 22 can also be estimated, and thereby a value of the temperature of refrigerant leaving the heat rejecting heat exchanger can be derived.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method for controlling a vapour compression system, the vapour compression system comprising at least one compressor, a heat rejecting heat exchanger, a high pressure expansion device, a receiver, an evaporator expansion device, an evaporator and a gas bypass valve, arranged in a refrigerant path, the vapour compression system further comprising one or more pressure sensors for measuring a refrigerant pressure at one or more positions along the refrigerant path and one or more temperature sensors for measuring a refrigerant temperature at the one or more positions along the refrigerant path, the method comprising the steps of:

estimating a mass flow of gaseous refrigerant along a part of the refrigerant path, based on measurements performed by some of the pressure sensors and temperature sensors, deriving a refrigerant pressure or a refrigerant temperature at a selected position of a pressure sensor or temperature sensor along the refrigerant path, based on the estimated mass flow, and registering that one of the pressure sensor(s) or one of the temperature sensor(s) is malfunctioning, and wherein the derived refrigerant pressure or refrigerant temperature of the malfunctioning sensor replaces the pressure measurements or temperature measurements performed by the malfunctioning sensor, wherein, if refrigerant pressure is derived at the selected position, the derived refrigerant pressure is not based on a measurement from a pressure sensor configured to measure pressure at the selected position, and wherein, if refrigerant temperature is derived at the selected position, the derived refrigerant temperature is not based on a measurement from a temperature sensor configured to measure temperature at the selected position.

2. The method according to claim 1, wherein the step of deriving a refrigerant pressure or a refrigerant temperature is further performed on the basis of one or more measurements performed by the pressure sensors and/or the temperature sensors.

3. The method according to claim 1, further comprising the step of controlling the vapour compression system using the derived refrigerant pressure or refrigerant temperature as a control parameter.

4. The method according to claim 1, further comprising the step of comparing the derived refrigerant pressure or refrigerant temperature to a measured refrigerant pressure or refrigerant temperature obtained by means of a pressure sensor or temperature sensor arranged at the selected position along the refrigerant path.

5. The method according to claim 1, wherein the step of estimating a mass flow of refrigerant is further based on a current compressor capacity and/or on an opening degree of one or more valves of the vapour compression system.

6. The method according to claim 1, wherein the estimated mass flow of refrigerant is a mass flow of refrigerant through the gas bypass valve.

7. The method according to claim 1, wherein the step of deriving the refrigerant pressure or the refrigerant temperature comprises deriving the refrigerant pressure of refrigerant leaving the heat rejecting heat exchanger.

8. The method according to claim 1, wherein the step of deriving the refrigerant pressure or the refrigerant temperature comprises deriving the refrigerant temperature of refrigerant leaving the heat rejecting heat exchanger.

9. The method according to claim 1, wherein the derived refrigerant pressure or refrigerant temperature is representative for a pressure prevailing inside the receiver.

10. The method according to claim 2, further comprising the step of controlling the vapour compression system using the derived refrigerant pressure or refrigerant temperature as a control parameter.

11. The method according to claim 2, further comprising the step of comparing the derived refrigerant pressure or refrigerant temperature to a measured refrigerant pressure or refrigerant temperature obtained by means of a pressure sensor or temperature sensor arranged at the selected position along the refrigerant path.

12. The method according to claim 3, further comprising the step of comparing the derived refrigerant pressure or refrigerant temperature to a measured refrigerant pressure or refrigerant temperature obtained by means of a pressure sensor or temperature sensor arranged at the selected position along the refrigerant path.

13. The method according to claim 2, wherein the step of estimating a mass flow of refrigerant is further based on a current compressor capacity and/or on an opening degree of one or more valves of the vapour compression system.

14. The method according to claim 3, wherein the step of estimating a mass flow of refrigerant is further based on a current compressor capacity and/or on an opening degree of one or more valves of the vapour compression system.

15. The method according to claim 4, wherein the step of estimating a mass flow of refrigerant is further based on a current compressor capacity and/or on an opening degree of one or more valves of the vapour compression system.

16. The method according to claim 2, wherein the estimated mass flow of refrigerant is a mass flow of refrigerant through the gas bypass valve.

17. The method according to claim 3, wherein the estimated mass flow of refrigerant is a mass flow of refrigerant through the gas bypass valve.

18. The method according to claim 4, wherein the estimated mass flow of refrigerant is a mass flow of refrigerant through the gas bypass valve.

19. The method according to claim 5, wherein the estimated mass flow of refrigerant is a mass flow of refrigerant through the gas bypass valve.

20. The method according to claim 2, wherein the step of deriving the refrigerant pressure or the refrigerant temperature comprises deriving the refrigerant pressure of refrigerant leaving the heat rejecting heat exchanger.

* * * * *